(12) United States Patent
Bakhsh et al.

(10) Patent No.: US 6,899,350 B2
(45) Date of Patent: May 31, 2005

(54) INFLATABLE CURTAIN

(75) Inventors: Ali Emam Bakhsh, Rochester Hills, MI (US); Rico Scott Bertossi, Richmond, MI (US); Ayad G. Nayef, Sterling Hts., MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 119 days.

(21) Appl. No.: 10/337,536

(22) Filed: Jan. 7, 2003

(65) Prior Publication Data

US 2004/0130128 A1 Jul. 8, 2004

(51) Int. Cl.$^7$ ............................................... B60R 21/22
(52) U.S. Cl. ................................................... 280/730.2
(58) Field of Search ......................... 280/730.2, 743.1, 280/729, 728.2

(56) References Cited

U.S. PATENT DOCUMENTS

| | | |
|---|---|---|
| 2,834,606 A | 5/1958 | Bertrand |
| 5,462,308 A | 10/1995 | Seki et al. |
| 5,588,672 A | 12/1996 | Karlow et al. |
| 5,755,457 A | 5/1998 | Specht |
| 5,788,270 A | 8/1998 | Haland et al. |
| 5,865,462 A | 2/1999 | Robins et al. |
| 5,865,465 A | 2/1999 | Bauer et al. |
| 5,884,937 A | 3/1999 | Yamada |
| 5,899,486 A | 5/1999 | Ibe |
| 5,957,487 A | 9/1999 | Stutz |
| 5,984,348 A | 11/1999 | Specht et al. |
| 6,010,149 A | 1/2000 | Riedel et al. |
| 6,073,961 A | 6/2000 | Bailey et al. |
| 6,079,732 A | 6/2000 | Nakajima et al. |
| 6,079,735 A | 6/2000 | Fallmann et al. |
| 6,082,761 A | 7/2000 | Kato et al. |
| 6,099,029 A * | 8/2000 | Haland et al. ............... 280/729 |
| 6,527,296 B2 * | 3/2003 | Bakhsh et al. ............ 280/730.2 |
| 2002/0153713 A1 * | 10/2002 | Fischer ..................... 280/730.2 |
| 2002/0180192 A1 * | 12/2002 | Tanase et al. ............. 280/730.2 |

* cited by examiner

Primary Examiner—David R. Dunn
(74) Attorney, Agent, or Firm—Tarolli, Sundheim, Covell & Tummino L.L.P.

(57) ABSTRACT

Apparatus (10) includes an inflatable vehicle occupant protection device (14) inflatable from a stored condition to a deployed position between a side structure (16) of the vehicle (12) and a vehicle occupant. The protection device (14) includes an upper edge (50), an opposite lower edge (52), and inflatable front and rear portions (64 and 66) and an inflatable main portion (62) positioned between the front and rear portions. The main portion (62) is rolled up into a rolled condition extending along the intersection of the side structure (16) and the roof (18) when in the stored condition. The front portion (64) is folded into a folded condition extending along the A pillar (22) when in the stored condition. The rear portion (66) is folded into a folded condition extending along the C pillar (26) when in the stored condition.

21 Claims, 5 Drawing Sheets

INFLATABLE CURTAIN

FIELD OF THE INVENTION

The present invention relates to an apparatus including an inflatable vehicle occupant protection device for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact and/or a vehicle rollover. A known inflatable curtain is inflated from a deflated condition by inflation fluid directed from an inflator to the inflatable curtain.

SUMMARY OF THE INVENTION

The present invention relates to an apparatus for helping to protect an occupant of a vehicle that has a side structure and a roof. The apparatus comprises an inflatable vehicle occupant protection device and an inflator. The protection device is inflatable from a stored condition to a deployed position between a side structure of the vehicle and a vehicle occupant. The protection device includes an upper edge, an opposite lower edge, and inflatable front and rear portions spaced away from each other and extending between the upper and lower edges. The protection device further includes an inflatable main portion positioned between the front and rear portions and extending between the upper and lower edges. The main portion is rolled up into a rolled condition extending along the intersection of the side structure and the roof when in the stored condition. The front portion is folded into a folded condition extending along the A pillar when in the stored condition. The rear portion is folded into a folded condition extending along the C pillar when in the stored condition.

The present invention also relates to an apparatus comprising an inflatable vehicle occupant protection device having a main portion including an upper edge, a front portion including forward edge, and a rear portion including rear edge. An inflation fluid source is actuatable to provide inflation fluid for inflating the protection device. The protection device has a stored condition in which the main portion is rolled up leaving the upper edge exposed for connection to the vehicle along the vehicle roof while in the stored condition along the intersection of the side structure and the vehicle roof. The front portion is folded up along fold lines extending generally parallel to the forward edge leaving the forward edge exposed and connectable along a vehicle A pillar while in the stored condition. The rear portion is folded up along fold lines extending generally parallel to the rear edge leaving the rear edge exposed and connectable along a vehicle C pillar while in the stored condition.

The present invention also relates to an apparatus comprising an inflatable vehicle occupant protection device including a front portion having a forward edge connectable along an A pillar of the vehicle and a rear portion having a rear edge connectable along a C pillar of the vehicle. An inflation fluid source is actuatable to provide inflation fluid for inflating the protection device. The forward edge is extendable forward of the A pillar at an acute angle relative to the A pillar when the protection device is in the non-inflated condition. When extended forward of the A pillar, the forward edge diverges from the A pillar with increasing distance along the forward edge away from the vehicle roof. The rear edge is extendable rearward of the C pillar at an acute angle relative to the C pillar when the protection device is in the non-inflated condition. When extended rearward of the C pillar, the rear edge diverges from the C pillar with increasing distance along the rear edge away from the vehicle roof.

The present invention also relates to an apparatus comprising an inflatable vehicle occupant protection device including an upper edge positioned along an intersection of a side structure of a vehicle and a vehicle roof and an opposite lower edge. The protection device further includes a front portion having a forward edge connectable along an A pillar of the vehicle and a rear portion having a rear edge connectable along a C pillar of the vehicle. An inflation fluid source is actuatable to provide inflation fluid for inflating the protection device. Slack exists in the protection device when in the non-inflated condition between the forward edge and the rear edge. The amount of slack between the forward edge and the rear edge increases with increasing distance along the forward edge and the rear edge away from the vehicle roof. The protection device includes at least one inflatable chamber having a length extending in a generally vertical direction from near the upper edge to near the lower edge of the protection device. The chamber has a tapered width with a narrowed width near the upper edge. The width of the chamber increases with increasing distance from the upper edge. The chamber is adapted to contract when inflated in a direction generally along the width of the chamber. The degree of contraction increases as the width of the chamber increases. The tapered width of the chamber is predetermined so as to take up the increasing slack between the forward edge and the rear edge and to tension the protection device when inflated.

The present invention also relates to a method for placing an inflatable vehicle occupant protection device in a stored condition. The method includes the step of providing an inflatable vehicle occupant protection device including an upper edge, an opposite lower edge, and inflatable front and rear portions spaced away from each other and extending between the upper and lower edges. The protection device further comprises an inflatable main portion positioned between the front and rear portions and extending between the upper and lower edges. The method also includes the step of rolling up the main portion into a stored condition extendable along an intersection of a side structure of a vehicle and a vehicle roof. The method further includes the step of folding the front portion into a stored condition extendable along an A pillar of the vehicle. The method still further includes the step of folding the rear portion into a stored condition extendable along a C pillar of the vehicle.

The present invention also relates to a method for placing an inflatable vehicle occupant protection device in a stored condition. The method includes the step of providing an inflatable vehicle occupant protection device having a main portion including an upper edge, a front portion including forward edge, and a rear portion including rear edge. The upper edge is connectable to a vehicle along an intersection of a side structure of the vehicle and a roof of the vehicle. The forward edge is connectable to the side structure along an A pillar of the vehicle. The rear edge being connectable to the side structure along a C pillar of the vehicle. The method also includes the step of rolling up the main portion, leaving the upper edge exposed and connectable along the intersection of the side structure and the vehicle roof. The method also includes the step of folding the front portion along fold lines extending generally parallel to the forward edge, leaving the forward edge exposed and connectable along the A pillar. The method further includes the step of folding the rear portion along fold lines extending generally parallel to the rear edge, leaving the rear edge exposed and connectable along the C pillar.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

Figure 1:
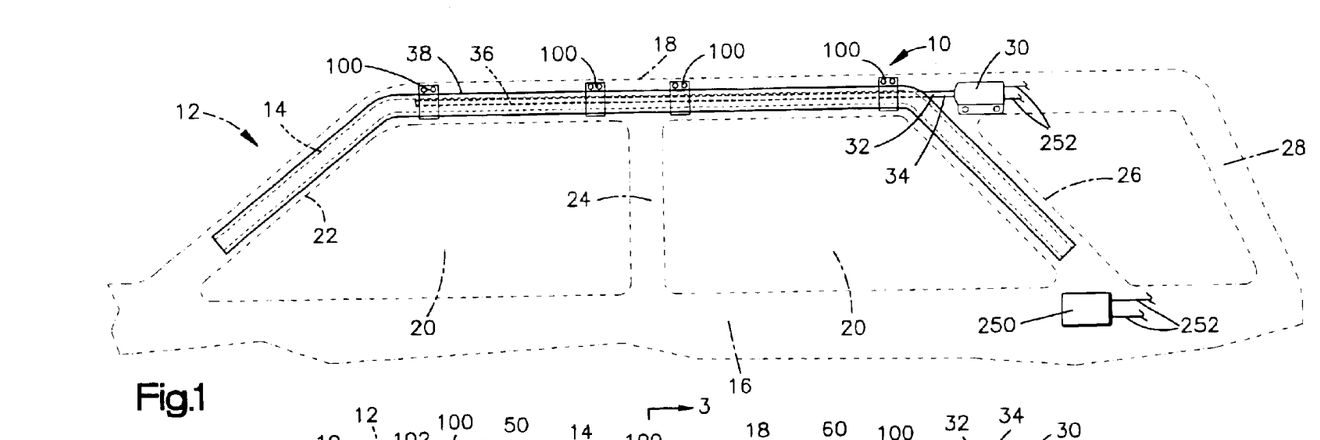
FIG. 1 is a schematic view of an apparatus for helping to protect a vehicle occupant illustrating the apparatus in a deflated condition, according to the invention.
Figure 2:
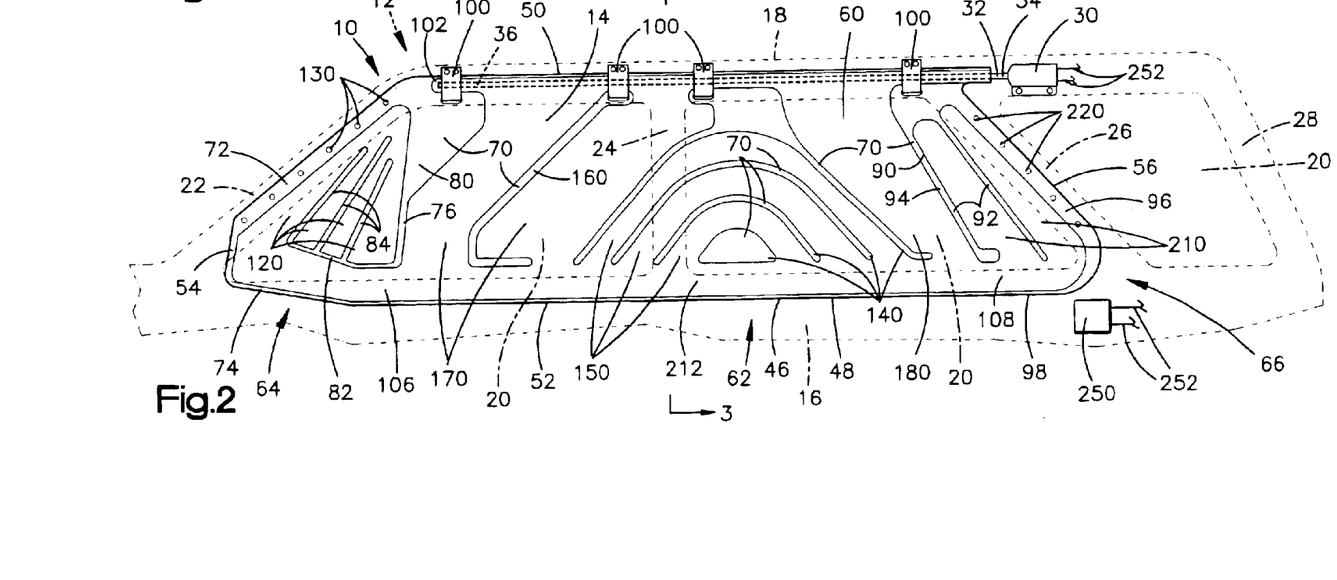
FIG. 2 is a schematic view of the apparatus of FIG. 1 in an inflated condition.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted along the side structure 16 of the vehicle 12 and a roof 18 of the vehicle. The side structure 16 of the vehicle 12 includes side window openings 20, an A pillar 22, a B pillar 24, and a C pillar 26. The side structure 16 may also include a D pillar 28. An inflator 30 is connected in fluid communication with the inflatable curtain 14 through a fill tube 32.

The fill tube 32 has a first end portion 34 for receiving fluid from the inflator 30. The fill tube 32 has a second end portion 36 disposed in the inflatable curtain 14. The second end portion 36 of the fill tube 32 has a plurality of openings (not shown) that provide fluid communication between the fill tube 32 and the inflatable curtain 14.

The inflator 30 contains a stored quantity of pressurized inflation fluid (not shown) in the form of a gas for inflating the inflatable curtain 14. The inflator 30 alternatively could contain a combination of pressurized inflation fluid and ignitable material for heating the inflation fluid, or could be a pyrotechnic inflator that uses the combustion of gas-generating material to generate inflation fluid. As a further alternative, the inflator 30 could be of any suitable type or construction for supplying a medium for inflating the inflatable curtain 14.

The apparatus 10 has a stored condition in which the inflatable curtain 14 is stowed in a deflated condition. This is illustrated in FIG. 1. When the apparatus 10 is in the stored condition, the deflated inflatable curtain 14 has an elongated configuration and extends along the vehicle roof 18 and along the side structure 16 of the vehicle 12 above the side window openings 20. In the stored condition, portions of the inflatable curtain 14 extend along the A pillar 22 and C pillar 26 of the vehicle 12. The apparatus 10 may include a housing 38 (shown only in FIG. 1) that houses the inflatable curtain 14 in the stored condition.

Figure 3:
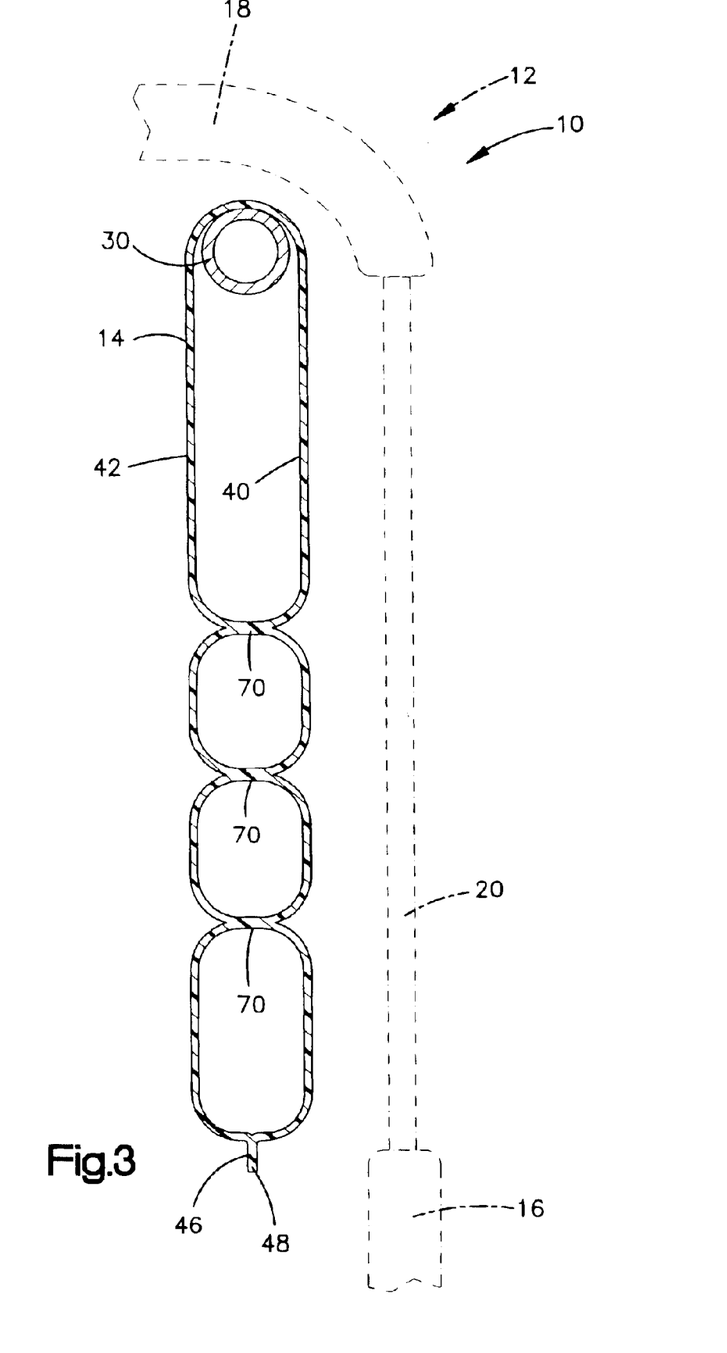
FIG. 3 is a sectional view of the apparatus taken generally along line 3—3 in FIG. 2.

Referring to FIG. 3, the inflatable curtain 14 comprises first and second panels 40 and 42 that are arranged in an overlying manner. The first and second panels 40 and 42 are interconnected to form a perimeter connection 46 (FIGS. 2 and 3) that extends along a perimeter 48 of the panels. The first and second panels 40 and 42 are also interconnected to form connections 70 within the perimeter 48 of the inflatable curtain 14.

In the embodiment illustrated in FIGS. 1–3, the perimeter connection 46 and the connections 70 are formed by weaving the panels 40 and 42 together. In this woven construction, the inflatable curtain 14 is formed by weaving the first and second panels 40 and 42 simultaneously while also interweaving the perimeter connection 46 and the connections 70 as single layers of fabric. This can be accomplished by using, for example, a Jacquard or Dobby weaving machine. The weaving machines are pre-programmed to weave the first and second panels 40 and 42 along with the perimeter connection 46 and connections 70 at the same time. No intermediate steps are required.

In an alternative construction of the inflatable curtain 14, means such as stitching, dielectric sealing, ultrasonic bonding, heat sealing, and adhesives may be used to interconnect the first and second panels 40 and 42 in order to form the perimeter connection 46 and the connections 70. In such alternative constructions, the inflatable curtain 14 may be formed by interconnecting two separate fabric pieces together along the perimeter connection 46 and the connections 70. As a further alternative, a single piece of fabric may be folded over to form the overlying first and second panels 40 and 42. In this alternative, the fold would form part of the perimeter connection 46 of the inflatable curtain 14.

The inflatable curtain 14 may have a variety of material constructions. For example, the inflatable curtain 14 may be constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14, in which case the curtain may have a non-woven construction. The materials used to construct the inflatable curtain 14 may also be single or multi-layered materials.

The first and second panels 40 and 42, the perimeter connection 46, and the connections 70 may be coated using a laminate film, slurry, and/or a spray coating, such as silicone, urethane, or other suitable material, in order to achieve a substantially gas-tight construction. This helps to prevent gas from permeating directly through the first and second panels 40 and 42, or through the perimeter connection 46 or connections 70.

The perimeter 48 (FIG. 2) of the inflatable curtain 14 is defined by upper and lower edges 50 and 52, respectively, of the curtain and front and rear edges 54 and 56, respectively, of the curtain that are spaced apart horizontally along the upper and lower edges. The perimeter connection 46 (FIG. 2) defines an inflatable volume 60 of the inflatable curtain 14. The perimeter connection 46 and the connections 70 help define a main portion 62, a front portion 64 and a rear portion 66 of the inflatable curtain 14.

The main portion 62, front portion 64, and rear portion 66 may have a variety of configurations defined by the shape of the perimeter connection 46 and the arrangement of the connections 70 within the perimeter connection. One such configuration is illustrated in FIGS. 1–4. It will be appreciated, however, that the configuration of the main portion 62, front portion 64, and rear portion 66 could vary without departing from the spirit of the present invention.

The main portion 62 is partially defined by the upper and lower edges 50 and 52 of the curtain and extends from the upper edge to the lower edge. A forward extent of the main portion 62 is defined by a front connection 80 of the inflatable curtain 14. A rearward extent of the main portion 62 is defined by a rear connection 90 of the inflatable curtain 14.

The front connection 80 intersects the perimeter connection 46 at the upper edge 50 of the inflatable curtain 14. The front connection 80 extends from the upper edge 50 of the inflatable curtain 14 towards the lower edge 52 of the curtain. The front connection 80 includes a portion 82 that extends forward into the front portion 64. The portion 82 is spaced from the perimeter connection 46 and positioned near the lower edge 52 of the inflatable curtain 14. The front connection 80 further includes branches 84 that extend from the portion 82 toward the upper edge 50.

The front portion 64 of the inflatable curtain 14 is partially defined by the upper edge 50, lower edge 52, front edge 54, and front connection 80. The front portion 64 has a generally tapered configuration that is narrowed toward the upper edge 50 and widens toward the bottom edge 52. As illustrated in FIG. 2, the upper and lower edges 50 and 52 have portions that extend at an angle towards each other in the front portion 64 of the inflatable curtain 14. The angled portion of the upper edge 50 forms a forward edge 72 of the front portion 64. The angled portion of the lower edge 52 forms a bottom edge 74 of the front portion 64. The front connection 80 forms a rear edge 76 of the front portion 64. The front edge 54 of the inflatable curtain 14 extends a relatively short distance between terminal ends of the upper and lower edges 50 and 52, i.e., between the forward edge 72 and bottom edge 74 of the front portion 64. The front edge 54 could, however, be omitted and the upper and lower edges 50 and 52 could be extended until they intersect, in which case the front portion 64 would be partially defined by the intersecting upper and lower edges.

The portion 82 of the front connection 80, being spaced from the perimeter connection 46, helps define a first inflation fluid passage 106 along the lower edge 52 of the inflatable curtain. The first inflation fluid passage 106 provides fluid communication between the main portion 62 and the front portion 64.

The branches 84 of the front connection 80 extend in a generally diagonally upward and rearward direction as viewed in FIG. 2. The branches 84 help define four inflatable chambers 120 in the front portion 64. Each of the chambers 120 has a generally tapered configuration including a narrow portion and an opposite wide portion. The narrow portion of each chamber 120 is positioned near the intersection of the forward edge 72 and the rear edge 76 of the front portion 64. The wide portion of each chamber 120 is positioned near the bottom edge 74 of the front portion 64. The chambers 120 are thus oriented such that the tapered configuration of the chambers coincides with the tapered configuration of the front portion 64.

The inflatable curtain 14 includes a plurality of fastener receiving apertures 130 spaced along the forward edge 72 of the front portion 64 of the curtain from a position near the upper edge 50 to a position near the forward edge 54 and lower edge 52. The fastener receiving apertures 130 extend through the perimeter connection 46. The perimeter connection 46 may be widened along the forward edge 72 in order to accommodate the apertures 130. Each of the fastener receiving apertures 130 receives a fastener (not shown), such as a bolt or screw, for helping to connect the forward edge 72 of the front portion 64 to the A pillar 22 of the vehicle 12. The forward edge 72 may thus be connected to the vehicle along the A pillar 22 from a position near the roof 18 to a position near a lower edge of an adjacent side window opening 20, as shown in FIG. 2. It will be appreciated, however, that the inflatable curtain 14 could be adapted to cooperate with any suitable means for connecting the forward edge 72 to the A pillar 22.

The front connection 80 may help define a pocket 102 for receiving the second end portion 36 of the fill tube 32. The pocket 102 surrounds the second end portion 36 of the fill tube 32 and forms a snug fit with the fill tube. The pocket 102 may thus help position the fill tube 32 in the inflatable curtain 14 and helps to maintain the position of the fill tube relative to the curtain.

The rear connection 90 intersects the perimeter connection 46 at the rear edge 56 of the curtain 14 at a position spaced close to the upper edge 50. The rear connection 90 and the perimeter connection 46 define an opening for receiving the fill tube 32. The rear connection 90 includes two branches 92 that extend in a generally diagonal direction rearward and downward as viewed in FIG. 2 towards the lower edge 52 of the inflatable curtain 14. The branches 92 of the rear connection 90 terminate at locations spaced from the perimeter connection 46 and positioned near the lower edge 52 of the inflatable curtain 14.

The rear portion 66 has a generally tapered configuration that is narrowed toward the upper edge 50 and widens toward the bottom edge 52. A forward edge 94 of the rear portion 66 is defined by the forwardmost one of the branches 92. A rear edge 96 of the rear portion 66 is defined by the rear edge 56 of the inflatable curtain 14. A lower edge 98 of the rear portion 66 is defined by a portion of the lower edge 52 of the inflatable curtain 14.

A second inflation fluid passage 108 is defined between the terminal end of the rear connection 90 and the perimeter connection of the inflatable curtain 14. The second inflation fluid passage 108 provides fluid communication between the main portion 62 and the rear portion 66.

The branches 92 of the rear connection 90 extend in a direction generally diagonally downward and rearward in the vehicle 12, as viewed in FIG. 2. The branches 92 help define two inflatable chambers 210 of the rear portion 66. The chambers 210 extend in a direction generally diagonally downward and rearward in the rear portion 64 towards the lower edge 52 of the inflatable curtain 14.

Each of the chambers 210 has a generally tapered configuration including a narrow portion and an opposite wide portion. The narrow portion of each chamber 210 is positioned towards the intersection of the forward edge 94 and the rear edge 96 of the rear portion 66. The wide portion of each chamber 210 is positioned towards the bottom edge 98 of the rear portion 66. The chambers 210 are thus oriented such that the tapered configuration of the chambers coincides with the tapered configuration of the rear portion 66.

The inflatable curtain 14 includes a plurality of fastener receiving apertures 220 spaced along the rear edge 56 of the curtain from a position near the upper edge 50 to a position near the lower edge 52. The fastener receiving apertures 220 extend through the perimeter connection 46. The perimeter connection 46 may be widened along the rear edge 56 of the inflatable curtain 14 to accommodate the apertures 220. Each of the fastener receiving apertures 220 receives a fastener (not shown), such as a bolt or screw, for helping to connect the rear edge 96 of the rear portion 66 to the C pillar 26 of the vehicle 12. The rear edge 96 may thus be connected to the vehicle along the A pillar 22 from a position near the roof 18 to a position near a lower edge of an adjacent side window opening 20, as shown in FIG. 2. It will be appreciated, however, that the inflatable curtain 14 could be adapted to cooperate with any suitable means for helping to connect the rear edge 96 to the C pillar 26.

The main portion 62 of the inflatable curtain 14 includes four middle connections 140. The middle connections 140 have a generally arc-shaped configuration. The middle connections 140 help to define three inflatable middle chambers 150 located in the main portion 62 of the inflatable curtain 14. The middle chambers 150 are generally arc-shaped and are positioned facing concavely downward, as viewed in FIG. 2, toward the lower edge 52 of the inflatable curtain 14. Each of the middle chambers 150 includes opposite terminal end portions that comprise inflation fluid inlets positioned near the lower edge 52 of the inflatable curtain 14.

The inflatable curtain 14 also includes a connection 160 located in the main portion 62 of the curtain. The connection 160 extends from a position near the upper edge 50 of the inflatable curtain 14 generally diagonally downward and forward as viewed in FIG. 2 to a position near the lower edge 52 of the curtain.

The front connection 80, perimeter connection 46, connection 160, and an outermost one of the middle connections 140 help to define a pair of inflatable chambers 170 located in the main portion 62 of the inflatable curtain 14. The chambers 170 extend in a generally diagonal direction between the upper and lower edges 50 and 52 of the inflatable curtain 14.

The rear connection 90, perimeter connection 46, and an outermost one of the middle connections 140 help to define an inflatable chamber 180 located in the main portion 62 of the inflatable curtain 14. The chamber 180 extends in a generally diagonal direction between the upper and lower edges 50 and 52 of the inflatable curtain 14.

The inflatable curtain 14 also includes a bottom chamber 212 that extends along the lower edge 52 of the curtain in the main portion 62 of the curtain. The bottom chamber 212 is in fluid communication with the chambers 170 and 180 and the middle chambers 150 of the inflatable curtain 14. The bottom chamber 212 is also in fluid communication with the front and rear portions 64 and 66 of the inflatable curtain 14 via the first and second inflation fluid passages 106 and 108, respectively.

The main portion 62, front portion 64 and rear portion 66 of the inflatable curtain 14 may also be adapted to receive fastening devices 100 (FIG. 2), such as clamps, for helping to connect the inflatable curtain 14 and the fill tube 32 to the vehicle 12. As shown in FIG. 2, the front connection 80, rear connection 90, and the connection 160 each may receive a fastening device 100 at their respective upper ends. The outermost one of the middle connections 140 may receive a fastening device 100 at its uppermost portion (as viewed in FIG. 2). The upper edge 50 of the inflatable curtain 14 is thus connected along the vehicle roof 18 by the fastening devices 100 and fill tube 30. The forward and rear edges 72 and 96 of the curtain 14 are connected along the A pillar 22 and C pillar 26 by fasteners.

The vehicle 12 includes a sensor mechanism 250 (shown schematically in FIGS. 1 and 2) for sensing the occurrence of an event for which occupant protection is desired, such as a side impact to the vehicle 12 and/or a rollover of the vehicle. The sensor mechanism 250 actuates the inflator 30 in response to sensing such an event.

Upon sensing the event for which actuation of the curtain 14 is desired to help protect a vehicle occupant, the sensor mechanism 250 provides an electrical signal over lead wires 252 to the inflator 30. The electrical signal causes the inflator 30 to be actuated in a known manner. The inflator 30 discharges fluid under pressure into the fill tube 32. The fill tube 32 directs the fluid into the main portion 62 of the inflatable curtain 14.

The inflatable curtain 14 inflates under the pressure of the inflation fluid from the inflator 30. The inflatable curtain 14 inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 (FIG. 3) is positioned adjacent the side structure 16 of the vehicle 12. The upper edge 50 (FIG. 2) of the inflatable curtain 14 is positioned along the intersection of the roof 18 and the side structure 16 of the vehicle 12. The front edge 54 of the inflatable curtain 14 is positioned along the A pillar 22 of the vehicle 12. The rear edge 56 of the inflatable curtain 14 is positioned along the C pillar 26 of the vehicle 12. The inflatable curtain 14 extends between the A pillar 22 and the C pillar 26 of the vehicle 12 and may overlie portions of the A pillar, C pillar, and B pillar 24 of the vehicle.

It will be recognized by those skilled in the art that the inflatable curtain may have alternative configurations. For example, in the illustrated embodiment, the inflatable curtain 14 extends between the A pillar 22 and the C pillar 26 of the vehicle 12. The inflatable curtain 14 could, however, extend between the A pillar 22 and the B pillar 24 only or between the B pillar and the C pillar 26 only. Also, the inflatable curtain 14 could extend between the A pillar 22 and the D pillar 28 of the vehicle 12.

The inflatable curtain 14, when inflated, helps to protect a vehicle occupant in the event of a vehicle rollover or a side impact to the vehicle 12. The connections 70 help to limit the thickness of the inflated inflatable curtain 14 and help to reduce the overall volume of the curtain. The inflatable chambers 150, 170, and 180 of the main portion 62, the chambers 120 of the front portion 64, the chambers 210 of the rear portion 66, and the bottom chamber 212, when inflated, help to absorb the energy of impacts with the inflatable curtain 14 and help to distribute the impact energy over a large area of the curtain.

As the inflatable curtain 14 is inflated, inflation fluid is directed from the fill tube 32 into the main portion 62 of the curtain. The inflation fluid is directed into the chambers 170 and 180 of the main portion 62. The inflation fluid inflates the chambers 170 and 180 and passes through the chambers into the bottom chamber 212 and then into the middle chambers 150.

Inflation fluid is also directed from the bottom chamber 212 into the front portion 64 through the first inflation fluid passage 106 and into the rear portion 66 through the second inflation fluid passage 108. Inflation fluid enters the front portion 64 and inflates the chambers 120 of the front portion. Inflation fluid also enters the rear portion 66 and inflates the chambers 210 of the rear portion.

The chambers 120 of the front portion 64, when inflated, expand radially, which causes the front portion to contract in a direction generally perpendicular to the length of the chambers, i.e., in a direction generally along the length of the inflatable curtain 14. The degree or distance that the chambers contract is related directly to the width of the chamber. The wide portions of the chambers 120 thus contract to a greater degree or a greater distance than the narrow portions of the chambers. The front portion 64, when inflated, experiences the greatest amount of contraction along the bottom edge 74 because the wide portions of the chambers 120 are positioned near the bottom edge.

The chambers 210 of the rear portion 66, when inflated, expand radially, which causes the rear portion to contract in a direction generally perpendicular to the length of the chambers, i.e., in a direction generally along the length of the inflatable curtain 14. The degree or distance that the chambers 210 contract is related directly to the width of the chambers. The wide portions of the chambers 210 thus contract to a greater degree or a greater distance than the narrow portions of the chambers. The rear portion 66, when inflated, experiences the greatest amount of contraction along the bottom edge 98 because the wide portions of the chambers 210 are positioned near the bottom edge.

The chambers 150, 170, and 180 of the main portion 62, when inflated, also expand radially, which causes the main portion to contract in a direction generally perpendicular to the length of the chambers, i.e., in a direction generally along the length of the inflatable curtain 14.

The main portion 62 and the front and rear portions 64 and 66 thus contract lengthwise along the length of the inflatable curtain 14, as measured in a generally horizontal direction, as viewed in FIG. 2. The inflatable curtain 14, being connected to the vehicle 12 along the A pillar 22 and the C pillar 26, is thus tensioned between the A pillar and C pillar when the portions 62, 64 and 66 contract lengthwise due to the inflation of the chambers 120, 150, 170, 180, and 212. This helps to maintain the inflatable curtain 14 in the inflated position of FIG. 2 throughout the duration of a side impact to the vehicle 12 and/or a vehicle rollover.

Referring to FIG. 2, the main portion 62 begins to inflate before the front and rear portions 64 and 66 begin to inflate. More specifically, the chambers 170 and 180 begin to inflate before the front and rear portions 64 and 66 begin to inflate. The rate at which the front and rear portions 64 and 66 are inflated depends partially upon the size of the inflation fluid passages 106 and 108. Also, as the main portion 62 is inflated, the chambers 170 and 180 begin to inflate before the middle chambers 150 begin to inflate. The rate at which the middle chambers 150 inflate depends partially on the distance between the terminal ends of the middle connections 140 and the lower edge 52. It will be appreciated, however, that the order in which the portions and/or the chambers of the inflatable curtain 14 inflate may vary depending on the configuration of the curtain.

Figure 4:
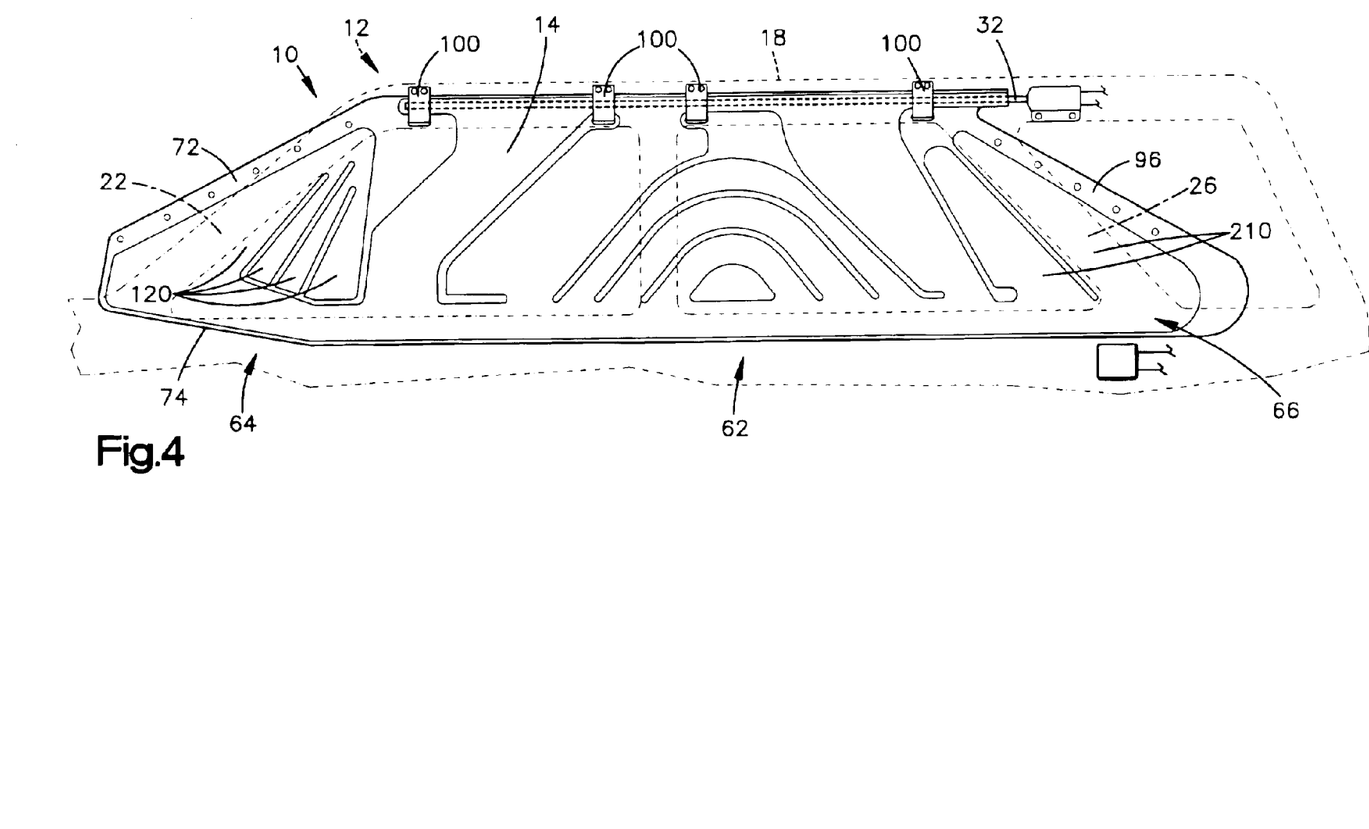
FIG. 4 is a schematic view of a portion of the apparatus illustrating the apparatus in a non-inflated and flattened out condition.

Referring to FIG. 4, according to the present invention, the inflatable curtain 14, when in a non-inflated and "flattened out" condition, extends forward beyond the A pillar 22 and rearward beyond the C pillar 26. The length of the flattened out inflatable curtain 14 is such that the forward edge 72 of the front portion 64 may be positioned forward of the A pillar 22 while the rear edge 96 of the rear portion 66 may simultaneously be positioned rearward of the C pillar 26.

In the non-inflated and flattened out condition, the forward edge 72 extends away from the vehicle roof 18 and forward of the A pillar 22 at an acute angle with the A pillar. As shown in FIG. 4, the forward edge 72 is spaced relatively close to the A pillar 22 at a position on the forward edge near the roof 18 of the vehicle 12. The distance between the forward edge 72 and the A pillar 22 increases as the distance along the forward edge away from the roof 18 increases.

The rear edge 96 of the rear portion 66 extends away from the vehicle roof 18 at an acute angle with the C pillar 26. The rear edge 96 is spaced relatively close to the C pillar 26 at a position on the rear edge near the roof 18 of the vehicle 12. The distance between the rear edge 96 and the C pillar 26 increases as the distance along the rear edge away from the roof 18 increases.

Because the inflatable curtain 14 extends beyond the A pillar 22 and C pillar 36 in the flattened condition, it will be appreciated that the curtain, when connected to the A and C pillars, will exhibit some looseness or slack when in a non-inflated condition. Upon inflation of the inflatable curtain 14, however, this looseness or slack will be taken up as the inflating curtain contracts lengthwise, and the curtain will become taut or tensioned between the A pillar 22 and the C pillar 26. As stated above, the chambers 120 of the front portion 64 and the chambers 210 of the rear portion 66 exhibit an increasing degree of contraction as the distance from the vehicle roof 18 increases from the narrow portion to the widened portion of their respective tapered configurations. This increasing degree of contraction helps account for the increasing distances between the forward edge 72 and the A pillar 22 and between the rear edge 96 and the C pillar 26 as the distance along the edges and away from the vehicle roof 18 increases.

According to the present invention, the configuration of the inflatable curtain 14 allows the curtain to be connected to the vehicle 12 along the roof 18, along the A pillar 22, and along the C pillar 26. The looseness or slack in the inflatable curtain 14 when in the non-inflated and flattened out condition allows the curtain to be placed in the stored condition while remaining connected along the roof 18, A pillar 22, and C pillar 26. Those skilled in the art will appreciate that rolling the inflatable curtain into the stored condition while remaining connected along the roof 18, A pillar 22, and C pillar 26 may be undesirable because twisting and bunching of the curtain may occur. This is because rolling the inflatable curtain 14 in a uniform roll that is free or substantially free from twisting and bunching requires that the forward and rear edges 72 and 96 of the inflatable curtain 14 be disconnected from the A pillar 22 and C pillar 26 in order to be free to roll up into the stored condition.

According to the present invention, a folding technique used to place the inflatable curtain 14 in the stored condition is conducive to the curtain being connected to the vehicle 12 along the A pillar 22 via the forward edge 72, along the C pillar 26 via the rear edge 96, and along the roof 18 via the fill tube 32 and the fastening devices 100. Since the inflatable curtain 14 is connected to the vehicle 12 along these forward, rearward, and upper extents of the curtain, one may encounter difficulties while placing the curtain in the stored condition. This is because the curtain 14, being connected to the vehicle 12 along these extents, may become twisted or bunched while placing the curtain in the stored condition. This could also negatively affect deployment of the curtain. According to a first embodiment of the present invention, the inflatable curtain 14 is placed in the stored condition by rolling the curtain in the area of the main portion 62 and folding the curtain in the area of the front and rear portions 64 and 66. This is shown in FIGS. 5A–5D.

In FIGS. 5A–5D, the inflatable curtain 14 is illustrated in a simplified schematic form in which the connections have been omitted for clarity. The areas of the main portion 62 and the front and rear portions 64 and 66 are delineated by the dashed front and rear lines indicated at 300 and 302, respectively. The main portion 62 is indicated generally between the front and rear lines 300 and 302. The front portion 64 is positioned forward of the front line 300. The rear portion 66 is positioned rearward of the rear line 302. In this description of an embodiment of the invention, when reference is made to rolling the main portion 62 or folding the front and/or rear portions 64 and 66, it is meant that the curtain is rolled or folded in the area of the respective portions. Thus, the main portion 62 may have portions near its intersection with the front portion 64 and/or rear portion 66 that exhibit some degree of folding. Also, the front portion 64 and/or the rear portion 66 may have portions near their respective intersections with the main portion 62 that exhibit some degree of rolling.

Figure 5A:
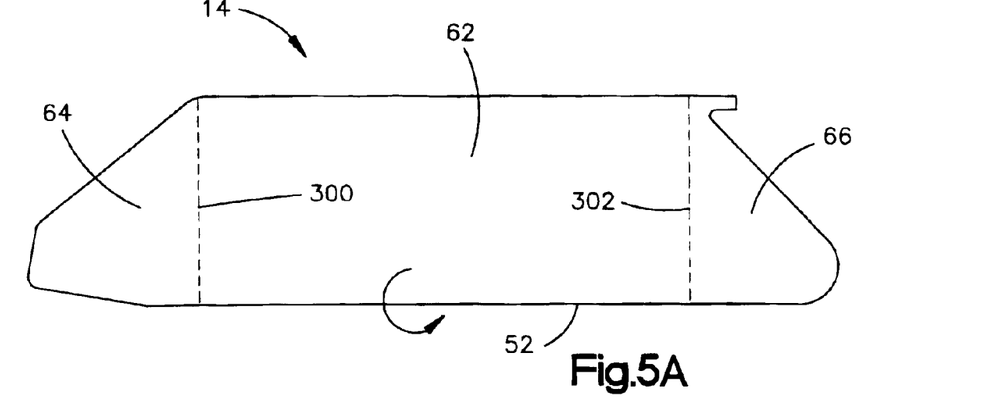
FIGS. 5A–5D are schematic views illustrating a method for placing the apparatus in a stored condition, according to a first embodiment of the invention.
Figure 6A:
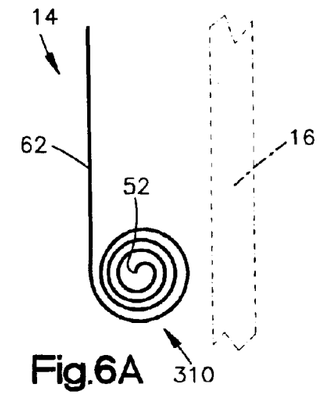
FIG. 6A is a sectional view of the apparatus taken generally along line 6A—6A in FIG. 5B.

Referring to FIG. 5A, when placing the inflatable curtain 14 in the stored condition, the main portion 62 is initially rolled in a direction indicated by the curved arrow in FIG. 5A. In the illustrated embodiment, the main portion 62 is rolled in an outboard direction. This "outboard roll" of the main portion 62 is illustrated at 310 in FIG. 6A. Referring to FIG. 6A, in the area of the outboard roll 310, the lower edge 52 of the inflatable curtain 14 is rolled in an outboard direction in the vehicle toward the side structure 16 of the vehicle. This is the preferred roll direction. It will be appreciated, however, that the main portion 62 of the inflatable curtain 14 could be rolled in an inboard direction away from the side structure 16.

Figure 5B:
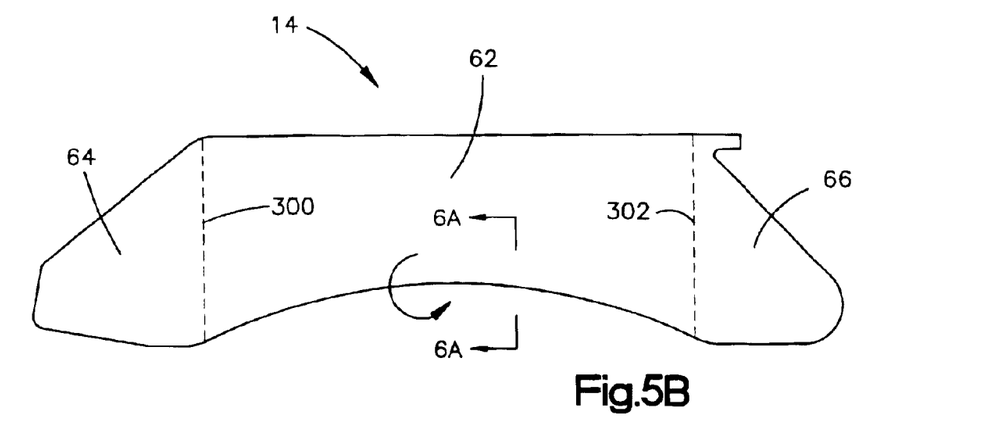

Referring to FIG. 5B, as the main portion 62 is initially rolled in the outboard direction, the front and rear portions 64 and 66 are maintained in a generally flat and unfolded/unrolled condition. Thus, the main portion 62 may assume a curved or arched shape while initially rolled in the outboard direction. This is shown in FIGS. 5B and 5C.

Figure 5C:
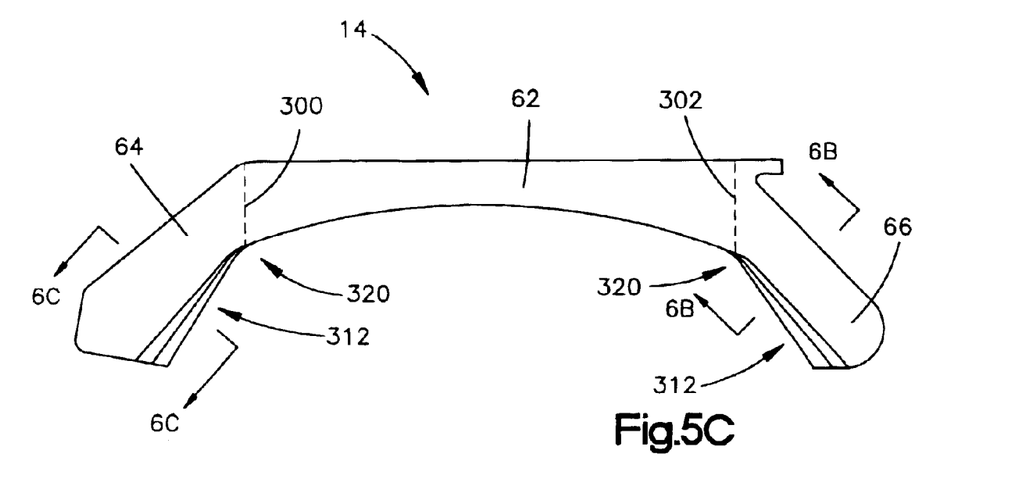
Figures 6B, 6C:
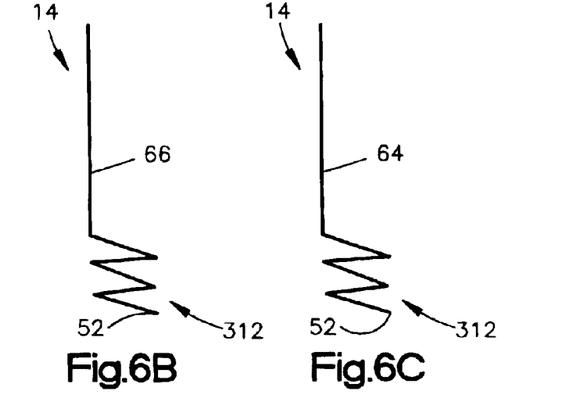
FIG. 6B is a sectional view of the apparatus taken generally along line 6B—6B in FIG. 5C.
FIG. 6C is a sectional view of the apparatus taken generally along line 6C—6C in FIG. 5C.

Referring to FIG. 5C, as the main portion 62 is rolled further, the front and rear portions 64 and 66 are folded. In the illustrated embodiment, the front and rear portions 64 and 66 are folded back and forth in what is referred to herein as a "fan fold." The fan fold used to place the front and rear portions 64 and 66 in the stored condition is illustrated at 312 in FIGS. 6B and 6C, respectively. As illustrated in FIGS. 6B and 6C, the front and rear portions 64 and 66 are folded in a back and forth manner in the area of the fan folds 312. The front portion 64 is folded along fold lines that extend in a direction generally parallel to the forward edge 72 in order to form the fan folds 312 of the front portion. The rear portion 66 is folded along fold lines that extend in a direction generally parallel to the rear edge 96 in order to form the fan folds 312 of the rear portion.

Referring to FIG. 5C, the inflatable curtain 14 may experience "bunching" at the transition between the rolled main portion 62 and the folded front and/or rear portions 64 and 66. This is illustrated generally at 320 in FIG. 5C. This bunching 320, however, can be minimized by exercising care in placing the inflatable curtain 14 in the stored condition. This is done by maintaining the yet-unfolded portions of the front and rear portions 64 and 66 in a smooth and flattened out condition so as to help prevent the bunching from occurring. Also, the fan folds 312 used to place the front and rear portions 64 and 66 in the stored condition may also help prevent formation of bunching 320. This is because, as illustrated in FIGS. 6A–6C, every other fold of the fan folds 312 is folded in the outboard direction, i.e., in the same direction as the outboard roll 310.

Figure 5D:
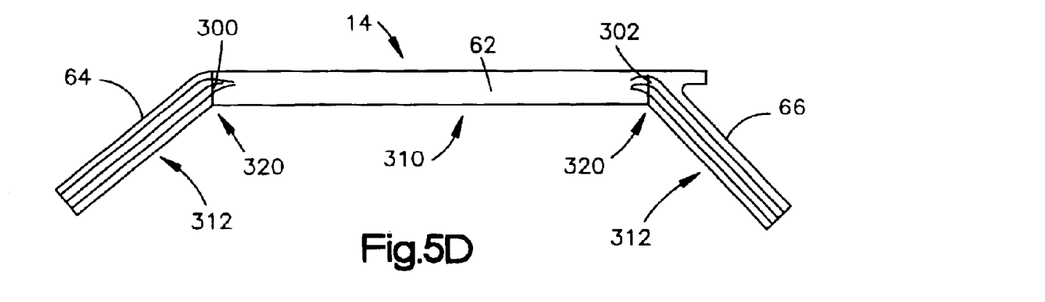

The main portion 62 continues to be rolled and the front and rear portions 64 and 66 continue to be folded in the manner described above until the inflatable curtain 14 is placed in the condition illustrated in FIG. 5D. When the inflatable curtain 14 is in the condition illustrated in FIG. 5D, the front and rear portions 64 and 66 are in a folded condition and the main portion 62 is in a rolled condition. The inflatable curtain 14 is thus ready to be connected to the vehicle 12 to place the curtain in the stored condition of FIG. 1.

When the front portion 64 is placed in the folded condition via the fan folding technique of the present invention, the forward edge 72, and the apertures 130 on the forward edge, are left exposed outside the fan fold 312. Similarly, when the rear portion 66 is placed in the folded condition via the fan folding technique of the present invention, the rear edge 96, and the apertures 220 on the rear edge, are left exposed outside the fan fold 312. This is because the front portion 64 is folded along fold lines generally parallel to the forward edge 72 and the rear portion 66 is folded along fold lines generally parallel to the rear edge 96. When the main portion 62 is in the rolled condition, the upper edge 50 is left exposed on the outside of the roll.

Advantageously, when the inflatable curtain 14 is in the folded and rolled condition, the forward edge 72, rear edge 96, and upper edge 50 are left exposed. This allows for placement of the forward edge 72 along the A pillar 22, placement of the rear edge 96 along the C pillar 26, and placement of the upper edge 50 along the intersection of the side structure 16 and the roof 18. As a result, the inflatable curtain 14, when in the stored condition, may be connected to the vehicle 12 along the A pillar 22, C pillar 26, and the intersection of the side structure 16 and the roof 18.

In the stored condition, the fan folds 312 of the front and rear portions 64 and 66 are stored along the A pillar 22 and C pillar 26, respectively. The outboard roll 310 of the main portion 62 is stored along the vehicle roof 18. Portions of the fan folds 312 near the transition between the fan folds and the outboard roll 310 could, however, be positioned along the vehicle roof 18. Conversely, portions of the outboard roll 310 near the transition between the outboard roll and the fan folds 312 could be positioned along the A pillar 22 and/or C pillar 26.

The method for placing the inflatable curtain 14 in the stored condition described herein helps facilitate connecting the inflatable curtain 14 to the vehicle 12 along the A pillar 22, C pillar 26, and roof 18. The outboard roll 310 of the main portion 62 helps ensure that the inflatable curtain 14 inflates along the vehicle side structure 16 (FIGS. 1 and 2) between the side structure and any occupants of the vehicle 12. The fan fold 312 of the front and rear portions 64 and 66 helps allow the front and rear portions to remain connected to the A pillar 22 and C pillar 26, respectively, while in the stored condition.

Figures 7A, 7B:
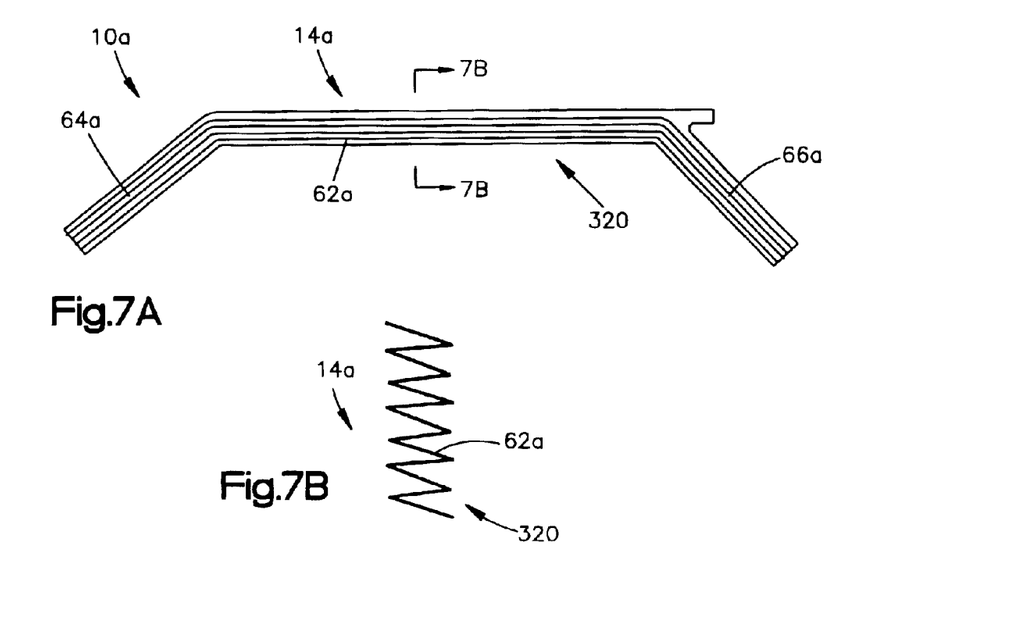
FIG. 7A is a schematic view illustrating a method for placing the apparatus in a stored condition, according to a second embodiment of the present invention.
FIG. 7B is a sectional view of the apparatus taken generally along line 7B—7B in FIG. 7A.

A second embodiment of the present invention is illustrated in FIGS. 7A and 7B. The second embodiment of the invention is similar to the first embodiment of the invention illustrated in FIGS. 1–6C. Accordingly, numerals similar to those of FIGS. 1–6C will be utilized in FIGS. 7A and 7B to identify similar components, the suffix letter "a" being associated with the numerals of FIGS. 7A and 7B to avoid confusion. The apparatus 10a of the second embodiment of the present invention is similar to the apparatus 10 of the first embodiment (FIGS. 1–6C), except that the main portion, like the front and rear portions, is folded into the stored condition.

Referring to FIGS. 7A and 7B, according to the second embodiment of the present invention, the inflatable curtain 14a is placed in the stored condition by folding the main portion 62a, front portion 64a, and rear portion 66a using a fan fold as described above with regard to the first embodiment. This fan folded portion 320 thus extends along the entire length of the inflatable curtain 14a. This fan fold 320 of the inflatable curtain 14a helps allow the front and rear portions 64a and 66a to remain connected to the A pillar and C pillar (not shown), respectively, while in the stored condition.

From the above description of the invention, those skilled in the art will perceive improvements, changes and modifications. For example, in the illustrated embodiment, the rolling and folding of the portions of the inflatable curtain coincides with distinct inflatable portions of the curtain, i.e., the front, middle, and rear portions. The rolling and/or folding need not, however, coincide with separate inflatable portions. The inflatable curtain could have any desired internal chamber configuration and still be placed in the stored condition in accordance with the rolling of the central portion and folding of the front and rear portions as disclosed herein. It is desirable, however, for reasons described herein, that the chamber configuration be arranged to provide a degree of contraction sufficient to provide a desired amount of tension along the curtain when inflated. These and other such improvements, changes and modifications within the skill of the art are intended to be covered by the appended claims.

What is claimed is:

1. Apparatus for helping to protect an occupant of a vehicle that has a side structure and a roof, said apparatus comprising:

an inflatable vehicle occupant protection device that is inflatable from a stored condition to a deployed position between the side structure of the vehicle and a vehicle occupant, said inflatable vehicle occupant protection device including an upper edge, an opposite lower edge, and inflatable front and rear portions spaced away from each other and extending between said upper and lower edges, said inflatable vehicle occupant protection device further comprising an inflatable main portion positioned between said front and rear portions and extending between said upper and lower edges; and an inflation fluid source that is actuatable to provide inflation fluid for inflating said inflatable vehicle occupant protection device;

said main portion being rolled up into a rolled condition extending along an intersection of the side structure and the vehicle roof, said front portion being folded into a folded condition extending along an A pillar of the vehicle, and said rear portion being folded into a folded condition extending along a C pillar of the vehicle when said inflatable vehicle occupant protection device is in said stored condition.

2. Apparatus as recited in claim 1, wherein said front portion includes a forward edge, said forward edge being exposed while said front portion is in said folded condition, said forward edge being connectable to the vehicle along the A pillar of the vehicle from a position on the A pillar near the vehicle roof to a position on the A pillar near a lower edge of a side window opening of the vehicle, said front portion when in said folded condition being positioned extending along the A pillar while said inflatable vehicle occupant protection device is in said stored condition.

3. Apparatus as recited in claim 2, wherein said front portion is folded into said folded condition via a fan fold, said front portion being folded along fold lines extending generally parallel to said forward edge of said front portion.

4. Apparatus as recited in claim 1, wherein said rear portion includes a rear edge, said rear edge being exposed while said rear portion is in said folded condition, said rear edge being connectable to the vehicle along the C pillar of the vehicle from a position on the C pillar near the vehicle roof to a position on the C pillar near a lower edge of a side window opening of the vehicle, said rear portion when in said folded condition being positioned extending along the C pillar while said inflatable vehicle occupant protection device is in said stored condition.

5. Apparatus as recited in claim 4, wherein said rear portion is folded into said folded condition via a fan fold, said rear portion being folded along fold lines extending generally parallel to said rear edge of said rear portion.

6. Apparatus as recited in claim 1, wherein said main portion is connectable to the vehicle along the vehicle roof, said main portion when rolled up in said rolled condition extending along the vehicle roof while said inflatable vehicle occupant protection device is in said stored condition.

7. Apparatus as recited in claim 1, wherein said main portion is rolled up into said rolled condition via an outboard roll.

8. Apparatus as recited in claim 1, wherein said front and rear portions are folded into said folded condition via a fan fold.

9. Apparatus as recited in claim 1, wherein said front portion includes a forward edge connectable along the A pillar of the vehicle and said rear portion includes a rear edge connectable along the C pillar of the vehicle;

said forward edge prior to being connected along the A pillar being extendable forward of the A pillar at an acute angle relative to the A pillar when said inflatable vehicle occupant protection device is in a non-inflated condition, said forward edge diverging from the A pillar with increasing distance along said forward edge away from the vehicle roof;

said-rear edge prior to being connected along the C pillar being extendable rearward of the C pillar at an acute angle relative to the C pillar when said inflatable vehicle occupant protection device is in said non-inflated condition, said rear edge diverging from the C pillar with increasing distance along said rear edge away from the vehicle roof.

10. Apparatus as recited in claim 9, wherein slack exists in said inflatable vehicle occupant protection device between the A pillar and the C pillar when said inflatable vehicle occupant protection device is in said non-inflated condition, prior to being folded and rolled, and has said forward edge connected to the A pillar and said rear edge connected to the C pillar, the amount of slack between the A pillar and the C pillar increasing with increasing distance along said forward edge and said rear edge away from the vehicle roof.

11. Apparatus as recited in claim 9, wherein said inflatable vehicle occupant protection device further comprises at least one inflatable chamber having a length extending in a generally verticle direction from near said upper edge to near said lower edge of said inflatable vehicle occupant protection device, said chamber having a tapered width with a narrowed width near said upper edge, the width of said chamber increasing with increasing distance away from said upper edge;

said chamber being adapted to contract when inflated in a direction generally along the width of said chamber, the degree of contraction increasing as the width of said chamber increases, the tapered width of said chamber being predetermined so as to take up the increasing slack between the A pillar and C pillar and tension said inflatable vehicle occupant protection device when inflated.

12. Apparatus for helping to protect an occupant of a vehicle that has a side structure and a roof, said apparatus comprising:

an inflatable vehicle occupant protection device having a main portion including an upper edge, a front portion including forward edge, and a rear portion including rear edge; and an inflation fluid source that is actuatable to provide inflation fluid for inflating said inflatable vehicle occupant protection device;

said inflatable vehicle occupant protection device having a stored condition wherein said main portion is rolled up leaving said upper edge exposed and connectable to the vehicle along an intersection of the side structure and the vehicle roof, said front portion is folded up along fold lines extending generally parallel to said forward edge leaving said forward edge exposed and connectable along the A pillar, and said rear portion is folded up along fold lines extending generally parallel to said rear edge leaving said rear edge exposed and connectable along the C pillar.

13. Apparatus for helping to protect an occupant of a vehicle, said apparatus comprising:

an inflatable vehicle occupant protection device inflatable from a non-inflated condition to an inflated condition between a side structure of the vehicle and a vehicle occupant, said inflatable vehicle occupant protection device including an upper edge, a front portion having a forward edge that extends transverse to said upper edge and is connectable along an A pillar of the vehicle and a rear portion having a rear edge that extends transverse to said upper edge and is connectable along a C pillar of the vehicle; and an inflation fluid source that is actuatable to provide inflation fluid for inflating said inflatable vehicle occupant protection device;

said forward edge being extendable forward of the A pillar at an acute angle relative to the A pillar when said inflatable vehicle occupant protection device is in said non-inflated condition, said forward edge diverging from the A pillar with increasing distance along said forward edge away from the vehicle roof;

said rear edge being extendable rearward of the C pillar at an acute angle relative to the C pillar when said inflatable vehicle occupant protection device is in said non-inflated condition, said rear edge diverging from the C pillar with increasing distance along said rear edge away from the vehicle roof.

14. Apparatus as recited in claim 13, wherein slack exists in said inflatable vehicle occupant protection device between the A pillar and the C pillar when said inflatable vehicle occupant protection device is in said non-inflated condition and has said forward edge connected to the A pillar and said rear edge connected to the C pillar, the amount of slack between the A pillar and the C pillar increasing with increasing distance along said forward edge and said rear edge away from the vehicle roof.

15. A method for placing an inflatable vehicle occupant protection device in a stored condition, said method comprising the steps of:

providing an inflatable vehicle occupant protection device including an upper edge, an opposite lower edge, and inflatable front and rear portions spaced away from each other and extending between said upper and lower edges, said inflatable vehicle occupant protection device further comprising an inflatable main portion positioned between said front and rear portions and extending between said upper and lower edges;

rolling up said main portion into a stored condition extendable along an intersection of a side structure of a vehicle and a vehicle roof;

folding said front portion into a stored condition extendable along an A pillar of the vehicle; and folding said rear portion into a stored condition extendable along a C pillar of the vehicle.

16. The method as recited in claim 15, further comprising the steps of:

connecting said front portion to the vehicle along the A pillar of the vehicle from a position on the A pillar near the vehicle roof to a position on the A pillar near a lower edge of a side window opening of the vehicle;

connecting said rear portion to the vehicle along a C pillar of the vehicle from a position on the C pillar near the vehicle roof to a position on the C pillar near a lower edge of a side window opening of the vehicle; and securing said main portion to the vehicle along the intersection of the side structure and the vehicle roof.

17. The method as recited in claim 15, wherein said step of rolling said main portion comprises the step of rolling said main portion in an outboard direction.

18. The method as recited in claim 15, wherein said step of folding said front and rear portions comprises the step of folding said front and rear portions using a fan folding technique.

19. A method for placing an inflatable vehicle occupant protection device in a stored condition, said method comprising the steps of:

providing an inflatable vehicle occupant protection device having a main portion including an upper edge, a front portion including forward edge, and a rear portion including rear edge, said upper edge being connectable to a vehicle along an intersection of a side structure of the vehicle and a roof of the vehicle;

rolling up said main portion, leaving said upper edge exposed and connectable along the intersection of the side structure and the vehicle roof;

folding said front portion along fold lines extending generally parallel to said forward edge, leaving said forward edge exposed and connectable along the A pillar; and folding said rear portion along fold lines extending generally parallel to said rear edge, leaving said rear edge exposed and connectable along the C pillar.

20. Apparatus for helping to protect an occupant of a vehicle that has a side structure and a roof, said apparatus comprising an inflatable vehicle occupant protection device inflatable between the side structure of the vehicle and a vehicle occupant, said inflatable vehicle occupant protection device including inflatable front and rear portions and an inflatable main portion positioned between said front and rear portions, said inflatable vehicle occupant protection device having a stored condition in which said main portion is rolled up along an intersection of the side structure and the vehicle roof, said front portion is folded up along an A pillar of the vehicle, and said rear portion is folded up along a C pillar of the vehicle.

21. Apparatus as recited in claim 20, wherein said front portion is connected to an A pillar of the vehicle and said rear portion is connected to a C pillar of the vehicle, said inflatable vehicle occupant protection device when deflated having slack between the A pillar and C pillar that increases as said inflatable vehicle occupant protection device extends away from the vehicle roof.

\* \* \* \* \*